(12) United States Patent
Harwath et al.

(10) Patent No.: US 8,076,903 B2
(45) Date of Patent: Dec. 13, 2011

(54) ELECTRIC POWER STORAGE AND DELIVERY SYSTEM AND METHOD OF OPERATION

(75) Inventors: Frank Harwath, Naperville, IL (US); Peter Tamburrino, Antioch, IL (US)

(73) Assignee: MicroSun Technologies LLC, Lisle, IL (US)

( * ) Notice: Subject to any disclaimer, the term of this patent is extended or adjusted under 35 U.S.C. 154(b) by 344 days.

(21) Appl. No.: 12/481,541

(22) Filed: Jun. 9, 2009
(Under 37 CFR 1.47)

(65) Prior Publication Data
US 2011/0080133 A1    Apr. 7, 2011

(51) Int. Cl.
*H01M 10/44* (2006.01)
*H01M 10/46* (2006.01)
(52) U.S. Cl. ........................................ 320/116
(58) Field of Classification Search .......... 320/101, 320/103, 112, 114, 115, 116, 128, 137, 138
See application file for complete search history.

(56) References Cited

U.S. PATENT DOCUMENTS

| | | | |
|---|---|---|---|
| 4,274,043 A * | 6/1981 | Heitz | ............................ 320/117 |
| 5,194,799 A | 3/1993 | Tomantschger | |
| 5,334,463 A | 8/1994 | Tajima et al. | |
| 5,916,699 A | 6/1999 | Thomas et al. | |
| 6,380,638 B1 | 4/2002 | Bitsche et al. | |
| 6,590,370 B1 | 7/2003 | Leach | |
| RE38,777 E | 8/2005 | Adams et al. | |
| 7,196,492 B2 | 3/2007 | Sugiura et al. | |
| 7,381,490 B2 | 6/2008 | Higashionji et al. | |
| RE40,663 E | 3/2009 | Silverman | |
| 7,521,138 B2 | 4/2009 | Pearson | |
| 2005/0249985 A1 | 11/2005 | Muller et al. | |
| 2006/0125319 A1 * | 6/2006 | King et al. | ................... 307/10.1 |
| 2006/0234115 A1 | 10/2006 | Watanabe et al. | |
| 2009/0103341 A1 * | 4/2009 | Lee et al. | ...................... 320/140 |

OTHER PUBLICATIONS

Andrew T. Stamps, Ralph E. White: "A LiCFx/Li-Ion Hybrid Power System for Pulsed-Power Applications" Presented Jul. 19, 2008 at 43rd Power Sources Conference, Philadelphia PA. "Proceedings of the 43rd Power Sources Conference" pp. 473-476.

* cited by examiner

*Primary Examiner* — Edward Tso
(74) *Attorney, Agent, or Firm* — Babcock IP, PLLC

(57) ABSTRACT

An electrical energy storage and delivery system for supplying electrical energy to a system load and method of operation. The system including an energy storage module comprising a charger coupled to a high power battery module and a high energy battery module; a first matrix switch coupled to the charger and a second matrix switch; and an energy shuttle coupled to a status signal of at least the energy storage module and the system load. The second matrix switch coupled to the first matrix switch, the high power battery module, the high energy battery module and a system load connection. The energy shuttle configured to transmit a plurality of control signals to set an interconnection state of the first matrix switch, the charger and the second matrix switch.

19 Claims, 1 Drawing Sheet

ELECTRIC POWER STORAGE AND DELIVERY SYSTEM AND METHOD OF OPERATION

BACKGROUND

1. Field of the Invention

The invention relates to an electric power storage and delivery system. More particularly, the invention relates to an electric power storage and delivery system suitable for both extended low current and short-term high current delivery, featuring improvements in the overall system power to weight ratio and configuration flexibility.

2. Description of Related Art

Battery chemistries may be selected according to a desired energy storage capacity and/or energy delivery characteristic. A battery with a chemistry selected for sustained low current delivery, an energy battery, typically has a higher total energy capacity and lower weight than a battery with a chemistry capable of delivering high current levels for significantly shorter periods, a power battery. Further, a low current delivery battery may require a similar low current charge input while a high current delivery battery may accept higher charge currents. Different battery chemistries may also have different temperature operating ranges.

Many electrical systems have electric power requirements with energy demand profiles including both low and high current levels. For example, an electric vehicle draws high current levels during acceleration and lower current levels for extended periods once a cruising speed is reached. Alternatively, communications and/or surveillance systems may draw low current levels for extended periods while in a standby/monitoring mode and high current levels during an active mode that is event triggered/engaged only intermittently for example for report/acknowledgment purposes.

Competition in the electric energy storage industry has focused attention on improving system flexibility, energy storage capacity and/or reduction of overall system weight. Therefore, it is an object of the invention to provide an electric energy storage arrangement that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing FIGURE in which they appear and, together with a general description of the invention given above, and the detailed description of the embodiments given below, serve to explain the principles of the invention.

DETAILED DESCRIPTION

Figure 1:
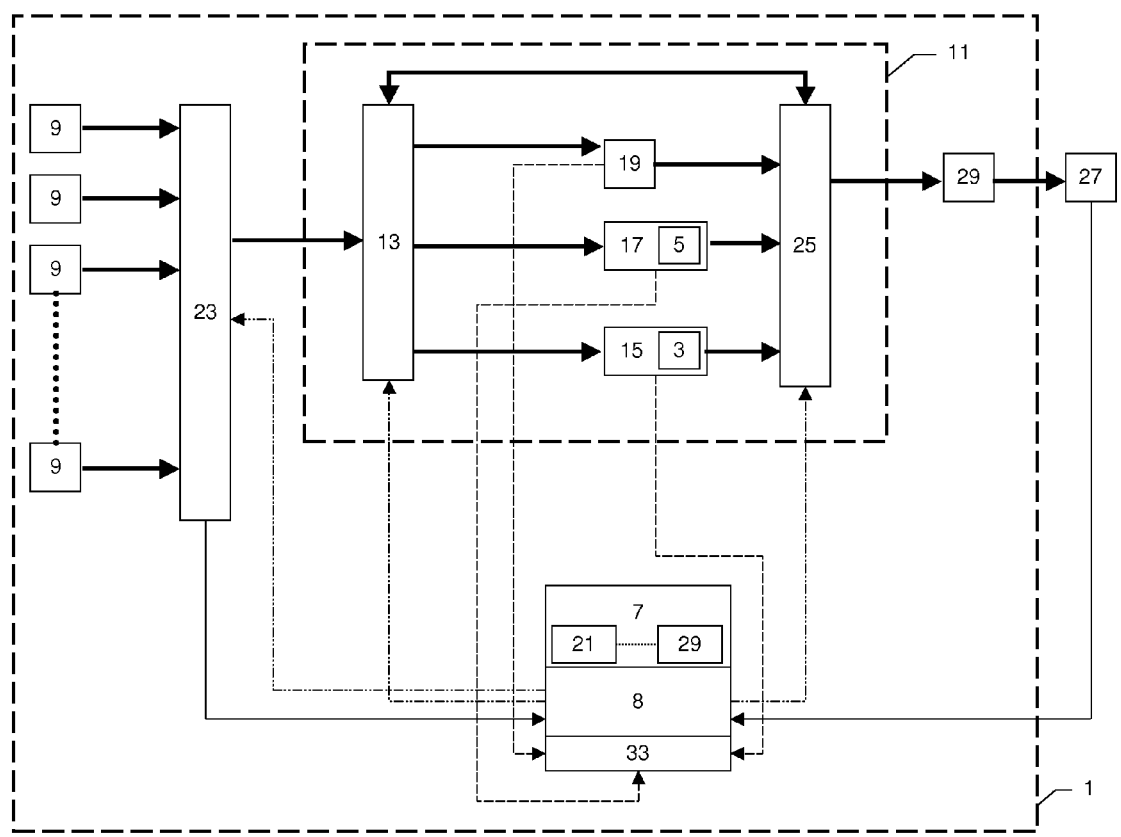
FIG. 1 is a schematic block diagram of an exemplary electric power storage and delivery system.

The inventor has recognized that an electric power storage and delivery system 1 including both high energy battery(s) 3 and high power battery(s) 5 coupled together via an intelligent power management, transfer, control and regulation module, hereafter referred to as an energy shuttle 7, as shown for example in FIG. 1, may enable an improved system weight to power ratio and increased system charging and application specific configuration flexibility.

The energy shuttle 7 operates as the system coordinator receiving status signal(s) 8 and determining how to couple current from any of various charging input(s) 9, such as from mains power, a generator, primary battery(s), fuel cells, solar cells and/or regenerative braking to separate energy storage sub-modules of an energy storage module 11 including a charger 13 and at least a high energy battery module 15 and a high power battery module 17. Alternatively, for example depending upon the expected current characteristics of the charging input(s) 9, the energy storage module 11 may also include an ultra capacitor 19 as an additional electrical energy storage option. A processor 21 within the energy shuttle 7 monitors system parameters such as the real-time availability and type of charging input(s) 9, energy storage module 11 battery state of charge (SOC) and system load demand characteristics to select energy transfer paths via a first matrix switch 23 between the charging input(s) 9 and the energy storage module 11 and/or between the energy storage module 11 and a second matrix switch 25 coupled to the system load 27, connected to the system via a system load connection 29.

The high energy battery module 15, for example lithium ion cobalt manganese battery cells ganged together or individually added to the high energy battery module 15, may report a common SOC for the high energy battery(s) 3 as a group or alternatively an individual SOC for each high energy battery 3. A primary use of the high energy battery module 15 is to provide steady low current levels over long periods, for example during system operation at a cruising speed and/or idle mode. High energy battery(s) 3 have the advantage of high energy density, for example 200 Wh/Kg. The high energy battery(s) 3 may be configured for ease of addition and/or removal of individual high energy battery 3 units from a common high energy battery bus, according to a specific mission/application energy demand forecast. Within the high energy battery module 15, individual high energy battery 3 cells may be electrically coupled together in parallel and/or serial configurations to arrive at a desired high energy battery module 15 output voltage and/or current characteristic.

The high power battery module 17, for example lithium ion iron phosphate battery cells may be ganged together or individually added to the high power battery module 17, may report a common SOC for the high power battery module 17 or alternatively an individual SOC for each high power battery 5. The primary use of the high power battery(s) 5 is to provide high current levels for short periods, such as bursts of acceleration. Although the high power battery(s) 5 have a lower energy density, for example 100 Wh/Kg, they are capable of delivering approximately eight times the current level of typical high energy battery(s). Further, where regenerative charging is available as a charging input 9, high power battery(s) 5 can accept the associated high currents therefrom as a charging current. The high power battery module 17 may be configured for ease of addition and/or removal of individual high power battery 5 units from a common high power battery bus, according to a specific mission/application energy demand forecast. Within the high power battery module 17, individual high power battery 5 cells may be electrically coupled together in parallel and/or serial configurations to arrive at a desired high energy battery module 17 output voltage and/or current characteristic.

If present, the ultra capacitor 19 module assists the high power battery module 17 with utilization of charging input (9) current pulses, such as generated by intermittent regenerative braking or to be applied to a load with high instantaneous current demand.

The first matrix switch 23 between the charging input(s) 9 and the charger 13 and the second matrix switch 25 between the energy storage module 11 and the system load 27 are controlled by the energy shuttle 7. The first and second matrix switches 23,25 may be separate switches or portions of a single integral matrix switch. By configuration of an interconnection state of the first and second matrix switches 23,25 and/or charger 13, the energy shuttle 7 enables matching of the charging input(s) 9 present at any instant in time with the desired energy storage sub-module and/or directly to the system load 27. Similarly, the energy shuttle 7 configures the first and second matrix switches 23,25 to supply the system load 27 with power from the energy storage module 11 according to a preference algorithm 29 utilizing status inputs from the throughout the electric power storage and delivery system 1 attempting to match the monitored current level demand of the real time system load 27 with the most desirable storage source and/or SOC of the various energy storage sources available. The energy shuttle 7 may also be able to configure the first and second matrix switches 23,25 and charger 13 to route electrical power between any of the energy storage modules to inter-charge/maintain a desired SOC level and/or ratio of SOC for each of the energy storage modules. Further, the interconnection capabilities of the electric power storage and delivery system 1 as controlled by the energy shuttle 7 may enable simultaneous charging of the energy storage module 11 and current supply to the system load 27.

Alternatively, the first matrix switch 23 and/or the second matrix switch 25, or portions of either, may be applied as dedicated control lines directly between each and/or specific devices to be switched, under control of dedicated controller circuitry and/or clock cycle priority subroutines of the energy shuttle 7 to reduce switching time, for example responsive to the appearance of pulse/instantaneous charge currents from one or more of the charging input(s) 9 and/or current demand from the system load 27.

Each of the battery types/modules may also be provided with local sensor and control circuitry for generating status signal(s) 8 determining SOC, temperature and the state reporting and switching of discharge and/or charge field effect transistor (FET) switches also remotely controlled by the energy shuttle 7. Data communications between the first and second matrix switches, local circuitry of individual and/or groups of the batteries and the energy shuttle 7 may be via a proprietary or standardized smart bus data interface 33 such as Smbus or CANbus. SOC, voltage levels, charging circuit, temperature, cell imbalance and/or other data may also pass to the energy shuttle 7 over the data interface 33. Temperature sensor(s) and heater element(s) may be applied to the high energy battery module 15 and/or high power battery module 17 to enable the energy shuttle 7 to monitor battery temperature and energize heater element(s) as necessary to maintain a core temperature of the battery(s), for example specific to the selected chemistry of each battery, above a desired minimum temperature setpoint. Further, a high temperature setpoint of the temperature sensors may be monitored as an alarm and/or shut-down failsafe input to the energy shuttle 7.

Regenerative breaking may be available as a charging input 9, for example in a hybrid and/or electric only vehicle embodiment. The high current and/or transient nature of charging current resulting from regenerative braking is typically suitable for charging only the high power battery(s) 17. The energy shuttle 7, monitoring status signal(s) to sense the presence of regenerative breaking current, for example identified along a dedicated input to the energy shuttle 7 and/or via a current level above a desired setpoint, routes such current to the high power battery module 5 and/or ultra capacitor 19, if present, if the SOC of the high power battery module 17 and/or ultra capacitor 19, is below a desired setpoint, such as 85%.

Lower current level charging input(s) 9, such as solar cells and/or fuel cells may be routed by the energy shuttle 7 directly to the system load 27 and/or to either or both of the high energy and high power battery modules 15,17. Similarly, during periods of peak current draw by the system load 27, the energy shuttle 7 may configure the first and second matrix switches 23,25 to collect current contributions from both of the high power and the high energy battery modules 15,17 to supply the system load 27, in addition to any currents being received from any charging input(s) 9 and direct all available current to the system load 27.

Charging algorithm(s) 29 of the energy shuttle 7 may prioritize and/or adapt the desired SOC between the high energy battery module 15 and the high power battery module 17. For example, the energy shuttle 7 may prioritize charging of the high energy battery module 15 to a desired SOC over the high power battery module 17, for example where regenerative breaking is present/expected to intermittently contribute to the charging of the high power battery module 17.

The energy shuttle 7 may also direct charging currents from the high power battery module 17 to the high energy battery module 15 and vice versa, depending upon an SOC target range for each, specified in the charge algorithm 29 of the energy shuttle 7.

One skilled in the art will appreciate that the combination of high power battery(s) 5 and high energy battery(s) 3 into a common current pool under the direction of the energy shuttle 7 enables a system where the power to weight ratio is optimized and the current provided for a given system load 27 is from the battery/current source most efficient at providing the current level for any of a wide range of system load 27 situations, further extending the energy efficiency of the electric power storage and delivery system 1.

Also, the cross charging capabilities of the energy shuttle 7 enable improved charging input 9 utilization, as well as SOC maintenance between the high energy and high power battery(s) 3,5, for example to ensure that the high power battery(s) 5 are maintained at an SOC that increases the probability that any regenerative charging currents that become available will be utilized.

To further optimize the weight to power ratio of the system, the proportion of high energy battery(s) 3 to high power battery(s) 5 may be modified according to the system application and anticipated availability of certain types of charging inputs (9). For example, in a vehicle propulsion system featuring both regenerative and fuel cell charging inputs, the ratio of high energy battery(s) 3 to high power battery(s) may be 2 to 1. Similarly, where there is no regenerative charging input, the ratio of high energy battery(s) 3 to high power battery(s) 5 may be 3 to 1.

| Table of Parts | |
|---|---|
| 1 | electric power storage and delivery system |
| 3 | high energy battery |
| 5 | high power battery |
| 7 | energy shuttle |
| 9 | charging input |
| 11 | energy storage module |
| 13 | charger |
| 15 | high energy battery module |
| 17 | high power battery module |
| 19 | ultra capacitor |

-continued

Table of Parts

| | |
|---|---|
| 21 | processor |
| 23 | first matrix switch |
| 25 | second matrix switch |
| 27 | system load |
| 29 | algorithm |
| 33 | data interface |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. An electrical energy storage and delivery system for supplying electrical energy to a system load, comprising:
    an energy storage module comprising a charger coupled to a high power battery module and a high energy battery module;
    a first matrix switch coupled to the charger and a second matrix switch;
    the second matrix switch coupled to the first matrix switch, the high power battery module, the high energy battery module and a system load connection;
    an energy shuttle coupled to a status signal of at least the energy storage module and the system load;
    the energy shuttle configured to transmit a plurality of control signals to set an interconnection state of the first matrix switch, the charger and the second matrix switch.

2. The system of claim 1, further including at least one charging input(s) coupled to the first matrix switch.

3. The system of claim 2, wherein at least one of the charging input(s) is a fuel cell.

4. The system of claim 2, wherein at least one of the charging input(s) is a solar panel.

5. The system of claim 2, wherein at least one of the charging input(s) is a regenerative braking circuit.

6. The system of claim 2, wherein at least one of the charging input(s) is a battery.

7. The system of claim 2, wherein at least one of the charging input(s) is mains power.

8. The system of claim 1, further including an ultra capacitor in the energy storage module; the ultra capacitor coupled between the charger and the second matrix switch.

9. The system of claim 1, further including a computer processor in the energy shuttle; the computer processor processing an algorithm to determine the desired interconnection state.

10. The system of claim 9, wherein a state of charge of the high energy battery and the high power battery is a parameter in the algorithm.

11. The system of claim 9, further including at least one charging input(s) coupled to the first matrix switch and a magnitude of the charging input is a parameter of the algorithm.

12. The system of claim 1, wherein the energy shuttle is coupled to the high power battery module and the high energy battery module via a data interface.

13. The system of claim 1, wherein the first matrix switch and the second matrix switch are integral with one another.

14. The system of claim 1, wherein the status signal includes a temperature within at least one of the high power battery module and the high energy battery module.

15. The system of claim 14, further including a heater within at least one of the high power battery module and the high energy battery module.

16. A method for electrical energy storage and delivery to a system load, comprising the steps of:
    monitoring a status of an energy storage module comprising a charger coupled to a high power battery module and a high energy battery module;
    monitoring a magnitude of a charging input and a system load;
    determining from the magnitude of the charging input and the status of the energy storage module a desired destination within the energy storage module for the charging input;
    determining from the magnitude of the system load and the status of the energy storage module a desired source of electrical energy for the system load;
    interconnecting the charging input and the desired destination within the energy storage module; and
    interconnecting the desired source of electrical energy to the system load.

17. The method of claim 13, wherein the determination of the desired destination within the energy storage module for the charging input and the determination of the desired source of electrical energy for the system load is performed by a processor of an energy shuttle coupled to the energy storage module, a charging input sensor and a system load sensor.

18. The method of claim 13, further including the step of determining a state of charge of each of the high power battery module and the high energy battery module and if one of the state of charge is below a desired setpoint, interconnecting the one of the high power battery module and the high energy battery module with a higher state of charge to deliver a charging current to the one of the high power battery module and the high energy battery module with a lower state of charge.

19. The method of claim 16, wherein if the magnitude of the charging input exceeds a desired level, the charging input is coupled only to the high power battery module.

* * * * *